US006724461B1

United States Patent
Yamazaki

(10) Patent No.: US 6,724,461 B1
(45) Date of Patent: Apr. 20, 2004

(54) METHOD AND APPARATUS FOR READING IMAGES USING CORRECTION CONDITIONS TO PROCESS FINE SCAN DATA

(75) Inventor: Yoshirou Yamazaki, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/324,123

(22) Filed: Jun. 2, 1999

(30) Foreign Application Priority Data

Jun. 2, 1998 (JP) .......................................... 10-152782

(51) Int. Cl.$^7$ ....................... G03B 27/52; G03B 27/00; G03B 27/68
(52) U.S. Cl. ............................... 355/40; 355/18; 355/52
(58) Field of Search ............................ 355/40, 55, 56, 355/45, 77, 18, 52; 358/296, 302, 456

(56) References Cited

U.S. PATENT DOCUMENTS

| | | | |
|---|---|---|---|
| 4,987,440 A | * 1/1991 | Benker et al. | ................. 355/77 |
| 5,745,262 A | 4/1998 | Tatsumi | |
| 5,828,461 A | * 10/1998 | Kubo et al. | ................. 358/296 |
| 5,995,201 A | * 11/1999 | Sakaguchi | ................. 355/55 |
| 6,005,680 A | * 12/1999 | Luther et al. | ................. 358/456 |
| 6,324,345 B1 | * 11/2001 | Enomoto | ................. 396/311 |

FOREIGN PATENT DOCUMENTS

| | | |
|---|---|---|
| JP | 09-065155 A | 3/1997 |
| JP | 09-116752 A | 5/1997 |

* cited by examiner

Primary Examiner—Russell Adams
Assistant Examiner—Peter B. Kim
(74) Attorney, Agent, or Firm—Birch, Stewart, Kolasch & Birch, LLP

(57) ABSTRACT

The method and apparatus for reading an image read photoelectrically an original image by prescan, set reading conditions in accordance with prescanned data obtained by the prescan, and perform fine scan that photoelectrically reads the original image to obtain fine scanned data for producing output image data. The method and apparatus analyze data of a preset area of the original image for both the prescanned data and the fine scanned data to calculate image characteristic values of the prescanned data and the fine scanned data of the preset area, calculate a correction condition for the fine scanned data such that the image characteristic values of the prescanned data and fine scanned data match and process the fine scannned data on the correction condition. As a result, the differences between image data (density information) obtained by prescan and fine scan can be cancelled out even during image reading at the high quantity of reading light in line with fast reading, and prints on which high quality images are reproduced can be output stably with high productivity by applying to a digital photoprinter.

17 Claims, 3 Drawing Sheets

METHOD AND APPARATUS FOR READING IMAGES USING CORRECTION CONDITIONS TO PROCESS FINE SCAN DATA

BACKGROUND OF THE INVENTION

The present invention relates to the technical field of a method and an apparatus for photoelectrically reading original images, particularly images recorded on films.

Heretofore, the images recorded on photographic films such as negatives and reversals (which are hereunder referred to simply as "films") have been commonly printed on light-sensitive materials (photographic paper) by means of direct (analog) exposure in which the film image is projected onto the light-sensitive material.

A new technology has recently been introduced and this is a printer that relies upon digital exposure. Briefly, the image recorded on a film is read photoelectrically, converted to digital signals and subjected to various image processing operations to produce image data for recording purposes; recording light that has been modulated in accordance with the image data is used to scan and expose a light-sensitive material to record a latent image, which is subsequently developed to produce a (finished) print. The printer operating on this principle has been commercialized as a digital photoprinter.

In the digital photoprinter, images can be processed as digital image data to determine the exposing conditions for printing; therefore, the digital photoprinter is capable of performing effective image processing operations such as the correction of washed-out highlights, or flat or dull shadows due to the taking of pictures with backlight or an electronic flash, and sharpening, and this enables the production of high-quality prints that reproduce images of the quality that has been impossible to achieve by the conventional direct exposure technique.

In addition, not only the assembling of images and the splitting of a single image into plural images but also the composing of characters can be performed by processing the image data and, as a result, prints can be outputted after various editing and/or processing operations have been performed in accordance with specific uses. Outputting images as prints (photographs) is not the sole capability of the digital photoprinter; the image data can be supplied into a computer or the like and stored in recording media such as a floppy disk; hence, the image data can be put to various non-photographic uses.

The digital photoprinter is basically composed of: a scanner (one of an image reading apparatus) that irradiates reading light to a film and photoelectrically reads an image recorded on the film by an image sensor such as a CCD sensor by sensing the light projected from the film; an image processing apparatus that performs predetermined image processing on image data captured by the scanner or supplied from a digital camera or the like to produce image data for image recording, that is, exposure conditions; a printer (image recording apparatus) that forms a latent image on a light-sensitive material by scan exposing it in accordance with the image data output from the image processing apparatus; and a processor (developing apparatus) that performs development processing on the light-sensitive material exposed by the printer to produce a (finished) print on which the image is reproduced.

In order that such a digital photoprinter outputs prints on which high-quality images are reproduced, it is necessary to obtain as much image information as possible from a film as an original and it is therefore necessary to read images at high resolution. To do so, it is desirable to read the range of all densities of an image recorded on a film by making the maximum use of the dynamic range of a scanner (image sensor).

On the other hand, to reproduce an appropriate image, it is necessary to read the range of all densities of an image recorded on a film by a scanner. However, images in a considerably wide range of densities may be recorded on films; some images may be appropriately exposed but others may be overexposed or underexposed, whereas the dynamic range of a image sensor is limited.

In short, presently, it is very difficult to read all images at high tone resolution in one reading condition.

For this reason, the scanner performs prescan to roughly read images before image reading (fine scan) for obtaining output image data, and sets reading conditions of fine scan in accordance with image data (prescanned data) obtained in the prescan.

To be more specific, in prescan, images are read, even in low tone resolution, under reading conditions that ensure the reading of all images. The obtained prescanned data is used to set reading conditions of the fine scan such that the output of the image sensor is saturated at a slightly lower density than the minimum density of the image of interest, and in fine scan images are read under the thus set reading conditions of the fine scan. By this method, the dynamic range of the image sensor is used to the maximum extent to provide for images having a variety of densities including underexposure and overexposure, thereby achieving image reading at high tone resolution.

Normal photoprinters use prescanned data to set image processing conditions including fine scanned data in an image processing apparatus and the like.

To improve the efficiency of creating prints, it goes without saying that a scanner must efficiently and quickly read images. To achieve this, the quantity (or intensity) of reading light must be increased to provide sufficient reading sensitivity for an image sensor no matter how short photometry time is. As is apparent from the foregoing description, the amount of reading light (light intensity) incident on films is different between prescan and fine scan; it is higher in fine scan.

Although output signal intensity (and image density) from an image sensor is different between prescanned data and fine scanned data because of different reading conditions, it must be basically identical as image data.

However, reading images at the high quantity (or intensity) of reading light would change image density characteristics of films due to heat or other factors and cause a difference in image data between prescanned data and fine scanned data that are different in the amount of reading light, causing deterioration in the quality of output images.

SUMMARY OF THE INVENTION

An object of the present invention is to solve the problems of the above described prior art and provide a method and an apparatus for reading images that photoelectrically read original images such as images recorded oh films by two image readings of prescan and fine scan, wherein the differences between image data (density information) obtained by prescan and fine scan can be cancelled out even during image reading at the high quantity of reading light in line with fast reading, and prints on which high quality images are reproduced can be output stably with high productivity by applying the method and apparatus for reading images according to the present invention to a digital photoprinter.

In order to attain the above-described object, according to the present invention, there is provided an image reading method that photoelectrically reads an original image by prescan, sets reading conditions in accordance with prescanned data obtained by the prescan, and performs fine scan that photoelectrically reads the original image to obtain fine scanned data for producing output image data, including:

analyzing both data of a preset area of the original image for both the prescanned data and the fine scanned data to calculate image characteristic values of the prescanned data and the fine scanned data of the preset area;

calculating a correction condition for the fine scanned data such that the image characteristic values of the prescanned data and fine scanned data match; and processing the fine scanned data on said correction condition.

Preferably, the preset area is a central portion of the original image.

Preferably, the preset area includes a central portion of the original image.

Preferably, the preset area is an area containing a plurality of portions including the central portion selected among a plurality of divided portions to which the original image is divided.

Preferably, the image characteristic value of the preset area is at least one selected from the group consisting of an average density of the preset area, one or more preset density point of a density histogram of the preset area, a highlight point of the preset area and a shadow point of the preset area.

Preferably, the image characteristic value of the preset area is calculated by using both the prescanned data and the fine scanned data which are corrected in device characteristics of means for reading the original image.

Preferably, both the prescanned data and the fine scanned data used for calculating the image characteristic value of the preset area are data subjected to data processing including dark correction, defective image correction and shading correction, data subjected to log conversion or both.

In order to attain the above-described object, the present invention provides an image reading apparatus for reading photoelectrically an original image that, when reading the image, performs prescan before performing fine scan intended to obtain output image data, and sets reading conditions for the fine scan in accordance with prescanned data obtained by the prescan, including:

prescan analysis device for analyzing prescanned data of a preset area of the original image to calculate an image characteristic value thereof;

memory device for storing fine scanned data obtained by fine scan;

fine scan analysis device for analyzing fine scanned data of the preset area of the original image to calculate an image characteristic value thereof;

correction condition setting device for setting a correction condition for the fine scanned data such that both the image characteristic values calculated by the prescan analysis means and said fine scan analysis means match; and corrector means for reading the fine scanned data from said memory means and correcting the read fine scanned data in accordance with the correction condition set by the condition setting means.

Preferably, the prescan analysis device and the fine scan analysis device calculate the image characteristic values by using the prescanned data and the fine scanned data corrected in device characteristics of the image reading apparatus.

Preferably, the preset area of the original image has a plurality of portions including a central portion.

Preferably, the image characteristic value is at least either an average density of the preset area, one or more preset density point of a density histogram of the preset area, or both.

DESCRIPTION OF THE INVENTION

The method and apparatus of the invention for reading images are now described in detail with reference to the preferred embodiment shown in the accompanying drawings.

Figure 1:
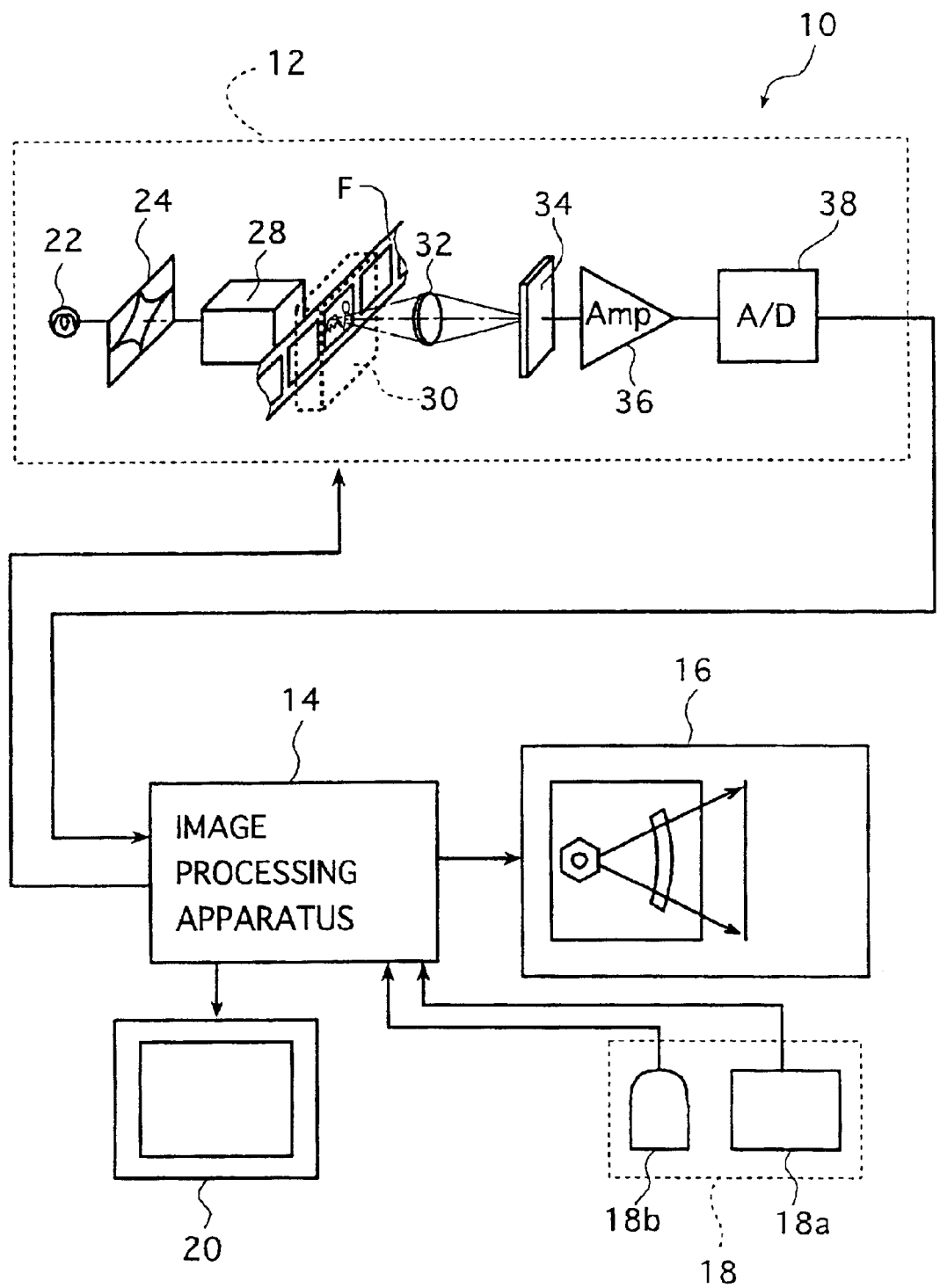
FIG. 1 is a block diagram of a digital photoprinter using an image reading apparatus of the present invention.

FIG. 1 is a block diagram of an exemplary digital photoprinter using the method and apparatus of the invention for reading images.

The digital photoprinter 10 shown in FIG. 1 (which is hereunder referred to simply as "photoprinter") comprises. basically a scanner 12 for photoelectrically reading the image recorded on a film F, an image processing apparatus 14 which performs image processing on the thus read image data and with which the photoprinter 10 as a whole is manipulated and controlled, and a printer 16 which performs imagewise exposure of a light-sensitive material (photographic paper) with light beams modulated in accordance with the image data delivered from the image processing apparatus 14 and which performs development and other necessary processing to produce a (finished) print. The scanner 12 and a part of the image processing apparatus 14 constitutes an image reading apparatus of the invention.

Connected to the image processing apparatus 14 are a manipulating unit 18 having a keyboard 18a and a mouse 18b for inputting (setting) various conditions, selecting and commanding a specific processing step and entering a command and so forth for effecting color/density correction, as well as a display 20 for representing the image read with the scanner 12, various manipulative commands and pictures for setting and registering various conditions.

The scanner 12 is an apparatus with which the images recorded on the film F are read photoelectrically frame by frame. It comprises a light source 22, a variable diaphragm 24, a diffuser box 28 which diffuses the reading light incident on the film F so that it becomes uniform across the plane of the film F, an imaging lens unit 32, an image sensor 34 having line CCD sensors capable of reading R (red), G (green) and B (blue) images, an amplifier (Amp) 36 and an A/D (analog/digital) converter 38.

In the photoprinter 10, dedicated carriers are available that can be loaded into the housing of the scanner 12 in accordance with the type of the film used (e.g., whether it is a film of the Advanced Photo System or a negative or reversal film of 135 size), the format of the film (e.g., whether it is a strip or a slide) or other factor. By replacing one carrier with another, the photoprinter 10 can be adapted to process various kinds of films in various modes. The images (frames) that are recorded on the film and which are subjected to the necessary procedure for print production are transported to and held in a specified reading position by means of the carriers.

The scanner 12 reads the images recorded on the film F in the following manner; the reading light from the light source 22 has its quantity adjusted by means of the variable diaphragm 24 and is incident on the film F held in the specified reading position by means of the carrier 30 and thereafter passes through the film F to produce projected light bearing the image recorded on it.

Figure 2A:
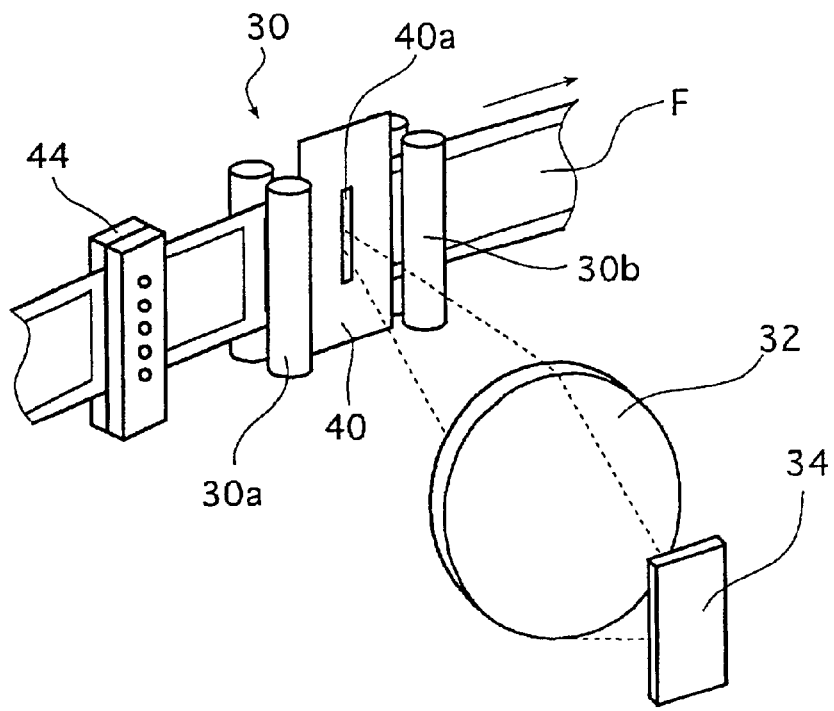
FIG. 2A is a conceptual view of a carrier to be installed in the image reading apparatus of the digital photoprinter shown in FIG. 1.

As shown schematically in FIG. 2A, the illustrated carrier 30 has a pair of transport roller pairs 30a and 30b and a mask 40 having a slit 40a. The transport rollers 30a and 30b are provided on opposite sides of the specified reading position in an auxiliary scanning direction which is perpendicular to the main scanning direction (i.e., the direction in which the line CCD sensors in the image sensor 34 extend) and they transport the film F with its length being parallel to the auxiliary scanning direction as it is in registry with the reading position. The slit 40a defines the projected light from the film F to have a specified narrow shape, is in registry with the reading position and extends in the main scanning direction.

Being held in registry with the reading position, the film F is transported in the auxiliary scanning direction by means of the carrier 30 as it is illuminated with the reading light. Consequently, the film F is subjected to two-dimensional slit scan with the reading light passing through the slit 40a extending in the main scanning direction, whereupon the image of each frame recorded on the film F is read.

Reference numeral 44 is a (bar) code reader for reading various bar codes such as the DX code, expanded DX code and FNS code that are recorded optically on the film. Information read by the code reader 44 is sent to specified sites of the image processing apparatus 14 and the like at need.

As already mentioned, the reading light passes through the film F held on the carrier 30 and the resulting image-bearing, projected light is focused by the imaging lens unit 32 to form a sharp image on the light-receiving plane of the image sensor 34.

Figure 2B:
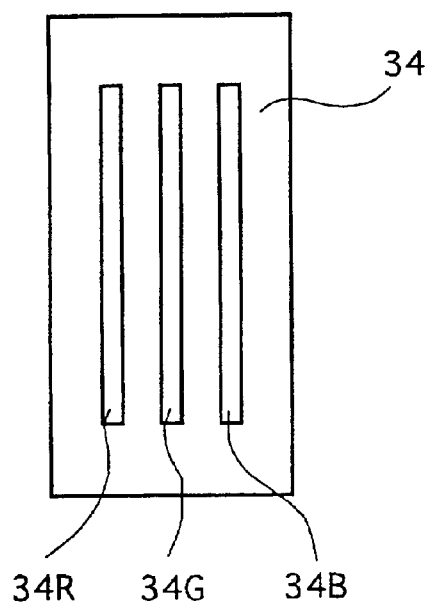
FIG. 2B is a conceptual view of an image sensor in the image reading apparatus of the digital photoprinter shown in FIG. 1.

As shown in FIG. 2B, the image sensor 34 is a 3-line color CCD sensor comprising a line CCD sensor 34R for reading R image, a line CCD sensor 34G for reading G image, and a line CCD sensor 34B for reading B image. As already mentioned, the respective line CCD sensors extend in the main scanning direction. The projected light from the film F is separated into three primary colors R, G and B and read photoelectrically by means of the image sensor 34.

The output signals from the image sensor 34 are amplified with the amplifier 36, converted to digital form in the A/D converter 38 and sent to the image processing apparatus 14.

In the scanner 12 according to the present invention, the images recorded on the film F are read by two scans for image reading, the first being prescan performing the image reading at low resolution and the second being fine scan for obtaining output image data after prescan.

Prescan is performed under preset reading conditions that ensure that the images on all films to be handled by the scanner 12 can be read without saturating the image sensor 34.

Fine scan uses the prescanned data and is performed under reading conditions that are set for each frame such that the image sensor 34 is also saturated at a slightly lower density than the minimum density of the image (frame) of interest. The prescanned data is also used to provide various image processing conditions for the image processing apparatus 14. These conditions are set by the setup subsection 72 of the condition setting section 60 described later.

The output signals for prescan and fine scan are therefore essentially the same data except for an f-stop number of the variable diaphragm 24, line CCD sensor storage time, line CCD sensor reading pixel density, auxiliary scanning transport speed of the film F, and measuring (sampling) timing of the line CCD sensors.

It should be noted that the scanner to be used in the photoprinter using the method and apparatus of the invention for reading images is by no means limited to a type that relies upon the slit scan reading described above but that it may be of a type that relies upon areal reading, or a technique by which the entire surface of the image in one frame is illuminated with the reading light for reading the image at a time.

In this alternative approach, an area CCD sensor may be used with means of inserting R, G, and B color filters being provided between the light source and the film F. Image reading with the area CCD sensor is performed with R, G and B color filters being sequentially inserted to color separate the image recorded on the film.

As already mentioned, the digital signals output from the scanner 12 are fed into the image processing apparatus 14 (which is hereinafter referred to as "processing apparatus 14").

Figure 3:
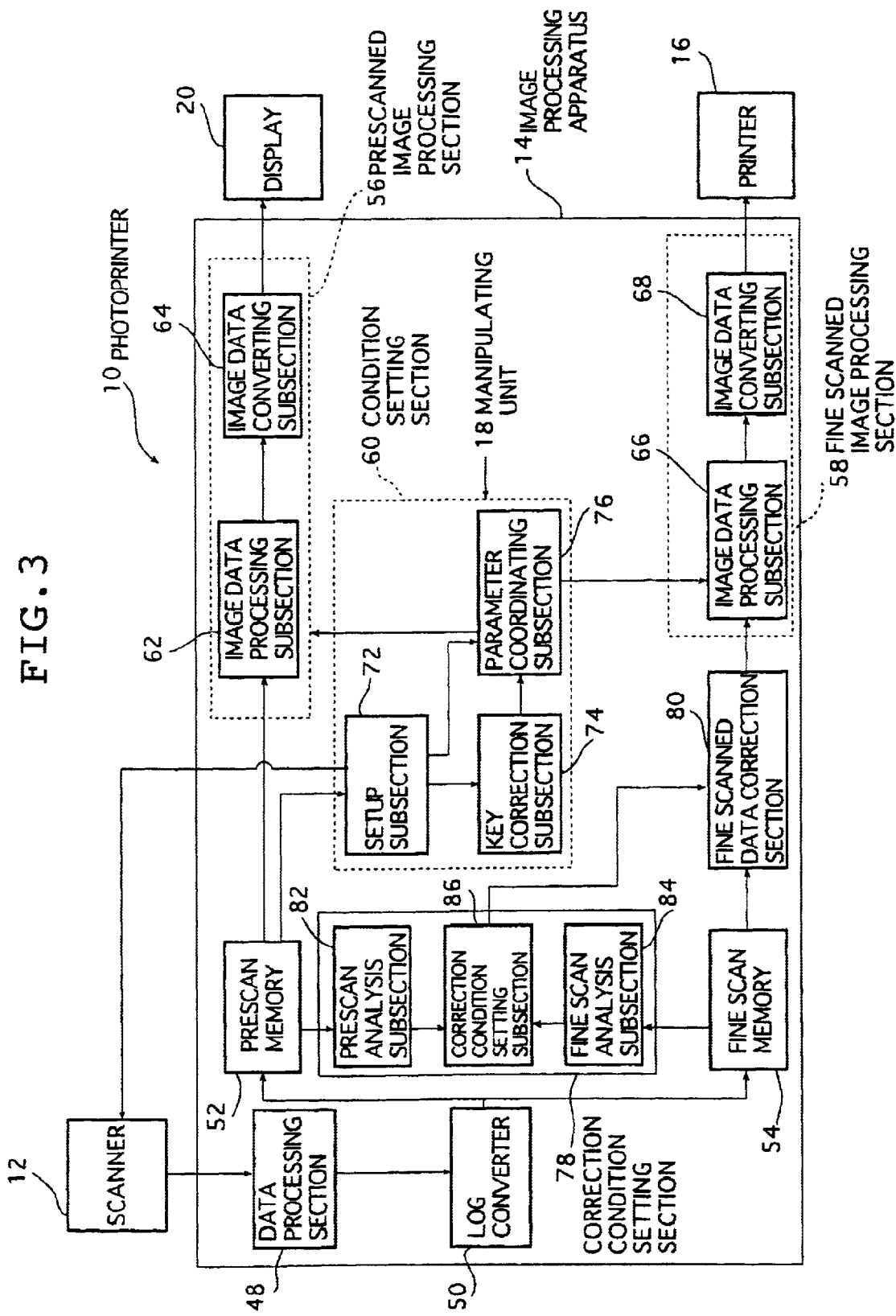
FIG. 3 is a block diagram of an image processing apparatus in the digital photoprinter shown in FIG. 1.

FIG. 3 is a block diagram of the processing apparatus 14, which includes a data processing section 48, a log converter 50, a prescan (frame) memory 52, a fine scan (frame) memory 54, a prescanned image processing section 56, a fine scanned image processing section 58, a condition setting section 60, a correction condition setting section 78, and a fine scanned data correction section 80.

FIG. 3 shows only the parts related to image processing and besides these parts, the processing apparatus 14 includes a CPU for controlling and managing the overall operation of the photoprinter 10 including the processing apparatus 14, and memories for storing the information necessary for the operation and otherwise of the photoprinter 10. The manipulating unit 18 and the display 20 are connected to related parts via the CPU and the like (CPU bus).

The R, G, and B digital signals output from the scanner 12 are sent to the data processing section 48, where they are subjected to specified data processing steps such as dark correction, defective image correction and shading correction. Thereafter, the processed digital signals are transferred into the log converter 50, where they are subjected to log conversion and converted to digital image data (density data).

That is, the image data is corrected on the device characteristics (input characteristics of the image data) of the scanner 12 by the data processing section 48 and the log converter 50 into digital image data.

The image data processed in the log converter 50 is stored in the memory, particularly, the prescanned data is stored in the prescan memory 52 and the image data obtained by fine scan, that is, fine scanned data is stored in the fine scan memory 54.

The prescanned data stored in the prescan memory 52 is read by the condition setting section 60 to set reading conditions and image processing conditions for fine scan. The prescanned data is processed in the prescanned image processing section 56 having an image data processing subsection 62 (hereinafter referred to as "processing subsection 62") and an image data converting subsection 64 and is displayed on a display 20 as a simulation (verification) image.

On the other hand, the fine scanned data stored in the fine scan memory 54, after being corrected in the fine scanned data correction section 80, is processed in the fine scanned image processing section 58 having an image data processing subsection 66 (hereinafter referred to as "processing subsection 66") and an image data converting subsection 68 and is output to a printer 16 as output image data.

The above described processing will be described in detail later.

The fine scanned data correction section 80 corrects the differences between image data (density information) of prescan and fine scan.

As described previously, the present invention determines reading conditions for fine scan from prescanned data; for prescan, reading conditions are determined so that all images can be read without saturating the image sensor 34, while for fine scan, reading conditions are determined such that the image sensor 34 is saturated at a slightly lower density than the minimum density of the image of interest.

That is, the quantity and/or intensity of reading light incident on films is different between prescan and fine scan; it is higher in fine scan. Still, in the reading by the slit scanning as illustrated embodiment, slower auxiliary scanning transport is performed in fine scan than in prescan in order to obtain the image data having high pixel density, and therefore, in fine scan, reading light is irradiated on the film F for a longer time.

Fast reading of images is required to obtain high productivity with a digital photoprinter. This requires a large quantity of reading light (highlight-intensity) incident on the film F. However, irradiation of the large quantity and/or the high intensity of the reading light into the film would cause change of image density characteristic of the film due to influence of heat or the like generated by the reading light.

Consequently, there might occur, between prescan and fine scan having different reading conditions, a difference in captured image data, which should be basically the same, so that image processing appropriate for the image of interest could not always be performed and could cause deterioration of image quality.

In contrast, the present invention corrects differences between prescanned data and fine scanned data caused by different reading conditions in the scanned data correction section 80, whereby deterioration of image quality due to the different reading conditions can be prevented and high-quality images can be stably output, so that the photoprinter 10 can output prints on which the high-quality images are reproduced, with high productivity by using the scanner 12 that fast reads images.

A correction condition in the fine scanned data correction section 80 is determined (set) in a prescan analysis subsection 82, a fine scan analysis subsection 84, and a correction condition setting section 78 having a correction condition setting subsection 86.

The prescan analysis section 82 reads prescanned data from the prescan memory 52, analyzes prescanned data of a preset or specific area of an image, and calculates image characteristic values of the preset area. The fine scan analysis subsection 84 reads fine scanned data from the fine scan memory 54, analyzes fine scanned data of a preset area of an image, and calculates image characteristic values of the preset area. In the prescanned data and fine scanned data, the preset areas are the same area in the image.

There is no limit to a preset area of an image; it is preferably a central portion of the image, and more preferably is an area containing a plurality of portions including the center of the image selected among a plurality of divided portions to which the image is divided. By defining an area containing a plurality of portions as the preset area, image characteristic values can be calculated at a place in which there more certainly exist bright and dark portions of an image, so that fine scanned data can be more accurately corrected.

There is also no limit to image characteristic values; various ones are usable. To be specific, there are exemplified at least one of an average density of the preset area, preferably one or more preset or proper density point (a frequency of x% point) of a density histogram containing a plurality of density points of the preset area, highlight (minimum density) of the preset area, shadow (maximum density) of the preset area, and the like.

These image characteristic values may be calculated by a well-known method performed in various image operations.

In the illustrated example, as a preferred embodiment, image characteristic values of a preset area is calculated from image data, which is processed by the data processing section 48 and the log converter 50 and corrected on the device characteristics (input characteristics of the image data) of the scanner 12. However, the present invention is not limited to this approach; the image characteristic values may be calculated from image data processed by one of the data processing section 48 and the log converter 50 or image data (output signals of the scanner 12) not processed by any of them. In this case, the fine scanned data correction section 80 may correct fine scanned data used to calculate image characteristic values to correct the differences between prescanned data and fine scanned data.

Image characteristic values of a preset area may be calculated using hardware without being limited to the way of reading image data from memory for calculation in a CPU or the like.

As required, image characteristic values may be calculated by performing resolution conversion processing to absorb the difference between the resolutions of prescanned data and fine scanned data.

Thinning-out of fine scanned data and the like are exemplified as methods of the resolution conversion processing.

The image characteristic values of preset areas of prescanned data and fine scanned data, calculated in the prescan analysis subsection 82 and the fine scan analysis subsection 84, are sent to the correction condition setting subsection 86.

The correction condition setting subsection 86 uses image characteristic values of the preset areas of both data to find a correction condition for correcting fine scanned data so that image characteristic values of prescanned data and image characteristic values of fine scanned data match in a preset area of an image. The correction condition is sent to the fine scanned data correction section 80 for setting as described previously.

There is no limit to the correction condition; various correction conditions are usable that help to match the image characteristic values of a preset area of fine scanned data after correction by the fine scanned data correction section 80 to the image characteristic values of the preset area of prescanned data. These correction conditions include an offset value for processing fine scanned data (suitable in the case of correspondence to image data after log conversion as in the illustrated example), a correction coefficient for multiplying a constant multiple by fine scanned data (suitable when image data is linear image data also after log conversion), a lookup table (LUT), a function and the like for processing fine scanned data.

To find a correction condition by calculating image characteristic values of a plurality of the preset areas, one correction condition to be set in the fine scanned data correction section 80 may be found by obtaining a simple mean of image characteristic values or correction conditions calculated from the preset areas, or one correction condition to be set in the fine scanned data correction section 80 may be found by averaging image characteristic values or correction conditions calculated from the preset areas, excluding the maximum and minimum ones.

As an alternative method, a plurality of image characteristic values, for example, the respective characteristic values of low-density, medium-density, and high-density regions in one or more preset areas may be calculated and used to calculate correction conditions.

The processing subsection 62 in the prescanned image processing section 56 and the processing subsection 66 in the fine scanned image processing section 58 are the sites where the image (image data) is subjected to specified image processing steps in accordance with the conditions that are set by means of the condition setting section 60 to be described later in this specification. The two processing subsections 62 and 66 perform basically the same processing except for resolution.

The image processing steps to be performed by the processing subsections 62 and 66 are not limited to any particular types and may be exemplified by various known image processing steps in the art. Examples include gray balance adjustment, tonal correction, density adjustment, saturation adjustment, electronic magnification, dodging (compressing/extending the density's dynamic range), and sharpening.

These steps are performed using look-up tables (LUTs), matrix (MTX) operations, a low-pass filter, an adder, and so forth, or by averaging, interpolation and other known means that use appropriate combinations of those devices.

The image data converting subsection 68 is a site where the image data processed by the processing subsection 66 is converted with a 3D (three-dimensional) LUT or the like into image data that is subsequently supplied into the printer 16 as image data for image recording by the printer 16. The image data converting subsection 64 optionally thins out the image data processed by the processing subsection 62 and similarly converts the thinned-out image data with a 3D-LUT or the like into image data for a display by the display 20.

The conditions for the processing to be done in the two image data converting subsections 64 and 68 and the processing subsections 62 and 66 are set in the condition setting section 60 (which is described below).

The condition setting section 60 sets the reading conditions for fine scan and the conditions for the various image processing steps to be done in the prescanned image processing section 56 and the fine scanned image processing section 58.

The condition setting section 60 includes a setup subsection 72, a key correcting subsection 74, and a parameter coordinating subsection 76.

The setup subsection 72 reads prescanned data from the prescan memory 52 and uses the prescanned data to create a density histogram and calculate average density, highlight, shadow, and other image characteristic values or amounts.

Next, it sets the reading conditions for fine scan, e.g., an f-stop number of the variable diaphragm 24, and storage time of the image sensor 34 (line CCD sensor) such that the output of the image sensor 34 is saturated at a slightly lower density than the minimum density of the image of interest. In addition to a density histogram and image characteristic amounts, it also sets various processing conditions in the prescanned image processing section 56 and the fine scanned image processing section 58 in response to operator's directions made as required.

The key correcting subsection 74 calculates adjustment amounts of image processing conditions (e.g., LUT correction amount, etc.) in response to correction keys or keys of the keyboard 18a for adjusting density (brightness), color, contrast, sharpness, saturation, etc., and various commands input by the mouse 18b, and supplies them to the parameter coordinating subsection 76.

The parameter coordinating subsection 76 receives image processing conditions set by the setup subsection 72, sets them in the prescanned image processing section 56 and the fine scanned image processing section 58, and corrects (adjusts) or resets image processing conditions set in the sites in accordance with adjustment amounts calculated in the key correcting subsection 74.

Hereinafter, the present invention will be described in more detail by describing the operation of the scanner 12 and the image processing apparatus 14.

Upon receipt of a request to print the film F, the operator mounts the carrier 30 corresponding to the film F in the scanner 12, sets the film F (cartridge) in a specified position of the carrier 30, inputs the size of a print to be created, and other necessary commands, and then directs the start of print creation.

Thereby, an f-stop number of the variable diaphragm 24 of the scanner 12 and storage time of the image sensor (line CCD sensor) are set in accordance with the reading conditions for prescan. Thereafter, the carrier 30 transports the film F in the auxiliary scanning direction at speed in accordance with the prescan, prescan is started, the film F is slit scanned in a specified reading position as described previously, projected light is focused and forms an image on the image sensor 34, and the image recorded on the film F is separated into R, G, and B and photoelectrically read.

In the present invention, prescan and fine scan may be performed on a frame-by-frame basis, or may be performed sequentially for all frames or by a specified number of frames. In an example below, to simplify description, an example of reading an image of one frame is described.

An output signal of the image sensor 34 by prescan is amplified by the amplifier 36 and is sent to the A/D converter 38 for conversion into a digital signal.

The digital signal is sent to the image processing apparatus 14, is subjected to specified data processing steps in the data processing section 48, is converted by the log converter 50 into prescanned data, which is digital image (density) data, and is stored in the prescan memory 52.

The prescanned data stored in the prescan memory 52 is read by the setup subsection 72 of the processing condition setting section 60.

The setup subsection 72 creates, from the prescanned data, a density histogram of an image and calculates image characteristic amounts such as highlight and shadow, sets the reading conditions of fine scan such that the output of the image sensor 34 is saturated at a slightly lower density than the minimum density of the image (frame) of interest, and supplies them to the scanner 12. Furthermore, it sets image processing conditions taking into account operator's indications made as required, as well as the density histogram and the calculated image characteristic amounts, and supplies them to the parameter coordinating subsection 76.

The parameter coordinating subsection 76 sets the received image processing conditions in specified sites (hardware) of the prescanned image processing section 56 and the fine scanned image processing section 58.

The prescanned data stored in the prescan memory 52 is also read into the prescan analysis subsection 82 of the correction condition setting section 78, and the image characteristic values of prescanned data of a preset or proper area of an image are calculated as described previously.

When verification is performed, the prescanned data is read from the prescan memory 52 by the processing subsection 62, is processed in the processing subsection 62, is converted in the image data converting subsection 64, and is displayed on the display 20 as a simulation image.

The operator performs the verification while viewing the contents of the display 20, and adjusts color, density, tone, and the like using the keyboard 18a and the like, as required.

The adjustment inputs are sent to the key correcting subsection 74, which calculates correction amounts of the image processing conditions in accordance with the adjustment inputs and sends them to the parameter coordinating subsection 76. The parameter coordinating subsection 76 corrects LUT, MTX, etc. of the processing subsections 62 and 66 in accordance with the sent correction amounts. Accordingly, images displayed on the display 20 change with the corrections, that is, adjustment inputs from the operator.

On judging that the image of the frame is correct (verification OK), the operator directs the start of printing using the keyboard 18a and the like. Thereby, the image processing conditions are established and are set in accordance with the reading conditions of fine scan set in the scanner 12 such as the f-stop number of the variable diaphragm 24, and the like, the carrier 30 transports the film F at speed corresponding to fine scan, and fine scan is started.

When no verification is performed, image processing conditions are determined upon termination of the setting of the image processing conditions in the fine scanned image processing section 58 by the parameter coordinating subsection 76, and fine scan is started.

The fine scan is performed in the same way as the prescan, except for the reading conditions of the fine scan such as auxiliary scanning transport speed of film F and the f-stop number of the variable diaphragm 24. An output signal from the image sensor 34 is amplified in the amplifier 36, is converted into a digital signal by the A/D converter 38, is processed in the data processing section 48 of the processing apparatus 14, is transformed into fine scanned data in the log converter 50, and is sent to the fine scan memory 54.

Fine scanned data stored in the fine scan memory 54 is read into the fine scan analysis subsection 84 of the correction condition setting section 78 to calculate the image characteristic values of fine scanned data of a preset or proper area of an image.

Next, the image characteristic values of preset areas of prescanned data and fine scanned data are supplied to the correction condition setting subsection 86, which calculates a correction condition for correcting the fine scanned data, e.g., an offset value for correcting the fine scanned data, such that the image characteristic values of a preset area of the fine scanned data after correction match the image characteristic values of prescan, and sets it in the fine scanned data correction section 80.

When the correction condition is set in the fine scanned data correction section 80, the fine scanned data is read into the fine scanned data correction section 80 and is corrected in accordance with the set correction condition, and the image is processed in the established image processing conditions in the processing subsection 66 and is converted into output image data in the image data converting subsection 68 before being output to the printer 16.

As described previously, an image (image data) processed in the image processing apparatus 14 is output to the display 20 and the printer 16.

The printer 16 comprises a printer that exposes a light-sensitive material. (photographic paper) to light in response to supplied image data to record a latent image, and a processor (developing apparatus) that performs predetermined processing on the exposed light-sensitive material to output a print.

The printer, after cutting a light-sensitive material to an appropriate length suitable for a print, records a back print, modulates and deflects to a main scanning direction three types of light beams, R, G, and B exposure corresponding to the spectral sensitivity of the light-sensitive material in accordance with image data output from the image processing apparatus 14, and transports the light-sensitive material in an auxiliary direction orthogonal to the main scanning direction, whereby the light-sensitive material is two-dimensionally scanned and exposed to the light beams to form a latent image and thereafter is supplied to the processor. On receiving the light-sensitive material, the processor performs predetermined wet development operations such as color development, bleaching and fixing, and water washing, and dries the light-sensitive material to make a print, and makes assortment in a predetermined unit of a roll of film for stacking.

A detailed description has been made of a method and apparatus for reading images according to the present invention. It goes without saying that the present invention is not limited to the above described embodiments and numerous improvements and modifications may be made to the present invention without departing from the spirit and scope of the invention.

As described above in detail, according to the present invention, differences between prescanned data and fine scanned data caused by different reading conditions can be corrected, deterioration of image quality due to the different reading conditions can be prevented, and high-quality images can be stably output, so that a photoprinter or the like can output prints on which high-quality images are reproduced, with high productivity by using a scanner that fast reads images.

What is claimed is:

1. An image reading method that photoelectrically reads an original image by prescan, sets reading conditions in accordance with prescanned data obtained by the prescan, and performs fine scan that photoelectrically reads the original image to obtain fine scanned data for producing output image data, comprising the steps of:

analyzing both data of a preset area of the original image for both the prescanned data and the fine scanned data to calculate at least respective preset density points of density histograms of the prescanned data and the fine scanned data of said preset area as image characteristic values of the prescanned data and the fine scanned data of said preset area;

calculating a correction condition for the fine scanned data such that the image characteristic values of the prescanned data and fine scanned data match; and processing the fine scanned data on said correction condition.

2. The image reading method according to claim 1, wherein said preset area is a central portion of the original image.

3. The image reading apparatus according to claim 2, wherein said image characteristic value is, in addition to said preset density point of the density histogram of the preset area, at least one selected from the group consisting of an average density of said preset area, one or more other preset density points of the density histogram of said preset area, a highlight point of the preset area and a shadow point of the preset area.

4. The image reading method according to claim 1, wherein said preset area includes a central portion of the original image.

5. The image reading method according to claim 4, wherein said preset area is an area containing a plurality of portions including the central portion selected among a plurality of divided portions to which the original image is divided.

6. The image reading method according to claim 1, wherein said image characteristic value of the preset area is calculated by using both the prescanned data and the fine scanned data which are corrected in device characteristics of means for reading the original image.

7. The image reading method according to claim 1, wherein both the prescanned data and the fine scanned data used for calculating the image characteristic value of the preset area are data subjected to data processing including dark correction, defective image correction and shading correction, data subjected to log conversion or both.

8. The image reading method according to claim 1, wherein said image characteristic value of the preset area is, in addition to said preset density point of the density histogram of the preset area, at least one selected from the group consisting of an average density of the preset area, one or more other preset density points of the density histogram of the preset area, a highlight point of the preset area and a shadow point of the preset area.

9. An image reading apparatus for reading photoelectrically an original image that, when reading the image, performs prescan before performing fine scan intended to obtain output image data, and sets reading conditions for said fine scan in accordance with prescanned data obtained by the prescan, comprising:

prescan analysis means for analyzing prescanned data of a preset area of the original image to calculate at least a preset density point of a density histogram of the prescanned data of said preset area as an image characteristic value thereof;

memory means for storing fine scanned data obtained by fine scan;

fine scan analysis means for analyzing fine scanned data of the preset area of said original image to calculate at least a preset density point of a density histogram of the fine scanned data of said preset area as an image characteristic value thereof;

correction condition setting means for setting a correction condition for the fine scanned data such that both the image characteristic values calculated by said prescan analysis means and said fine scan analysis means match; and correction means for reading the fine scanned data from said memory means and correcting the read fine scanned data in accordance with the correction condition set by said condition setting means.

10. The image reading apparatus according to claim 9, wherein the preset area of the original image has a plurality of portions including a central portion.

11. The image reading apparatus according to claim 9, wherein said prescan analysis means and said fine scan analysis means calculate said image characteristic values by using the prescanned data and the fine scanned data corrected in device characteristics of the image reading apparatus.

12. An image reading method comprising:

performing a first scan of an image and generating first image data;

performing a second scan of the image and generating second image data;

generating a correction condition by processing the first image data and the second image data; and applying the correction condition to the second image data, wherein the first scan is performed at a first resolution and the second scan is performed at a second resolution, and wherein the step of generating the correction condition includes analyzing the first image data and generating at least respective preset density points of a density histogram of the first image data as a first image characteristic value;

analyzing the second image data and generating at least respective preset density points of a density histogram of the second image data as a second image characteristic value;

comparing the first image characteristic value and the second image characteristic value; and generating the correction condition such that the first image characteristic value matches the second image characteristic value.

13. The method of claim 12 further comprising:

storing the first scan data in a first memory; and storing the second scan data in a second memory.

14. The method of claim 12 wherein applying the correction condition to the second image data corrects a difference in first image data and second image data and generates corrected second image data.

15. The method of claim 14 further comprising generating a second image by processing the corrected second image data.

16. An apparatus for reading an image comprising:

a scanner adapted to perform a first scan of an image and a second scan of an image;

a data processor adapted to generate image data from the image which has been scanned by the scanner;

a correction condition setting subsection adapted to compare image data from the first scan and the second scan and develop a correction condition such that the first scan data and the second scan data match, the correction condition setting subsection comparing at least respective preset density points of density histograms of the first scan data and the second scan data; and a fine scanned data correction section which uses the correction condition to correct the image data from the second scan, wherein the first scan is performed at a first resolution and the second scan is performed at a second resolution.

17. The apparatus of claim 16 further comprising:

a first scan data memory adapted to store the image data from the first scan;

a second scan data memory adapted to store the image data from the second scan;

a first scan analysis section adapted to generate a first image characteristic value from the image data from the first scan, said first image characteristic value corresponding to said preset density points of the density histogram of the first scan data;

a second scan analysis section adapted to generate a second image characteristic value from the image data from the second scan, said second image characteristic value corresponding to said preset density points of the density histogram of the second scan data, wherein the image data used by the correction condition setting condition subsection to generate the correction condition includes the first image characteristic value and the second image characteristic value.

\* \* \* \* \*